May 31, 1938.  J. W. McDONNELL  2,118,852
PRESSURE RESPONSIVE APPARATUS
Filed March 2, 1936  2 Sheets-Sheet 1
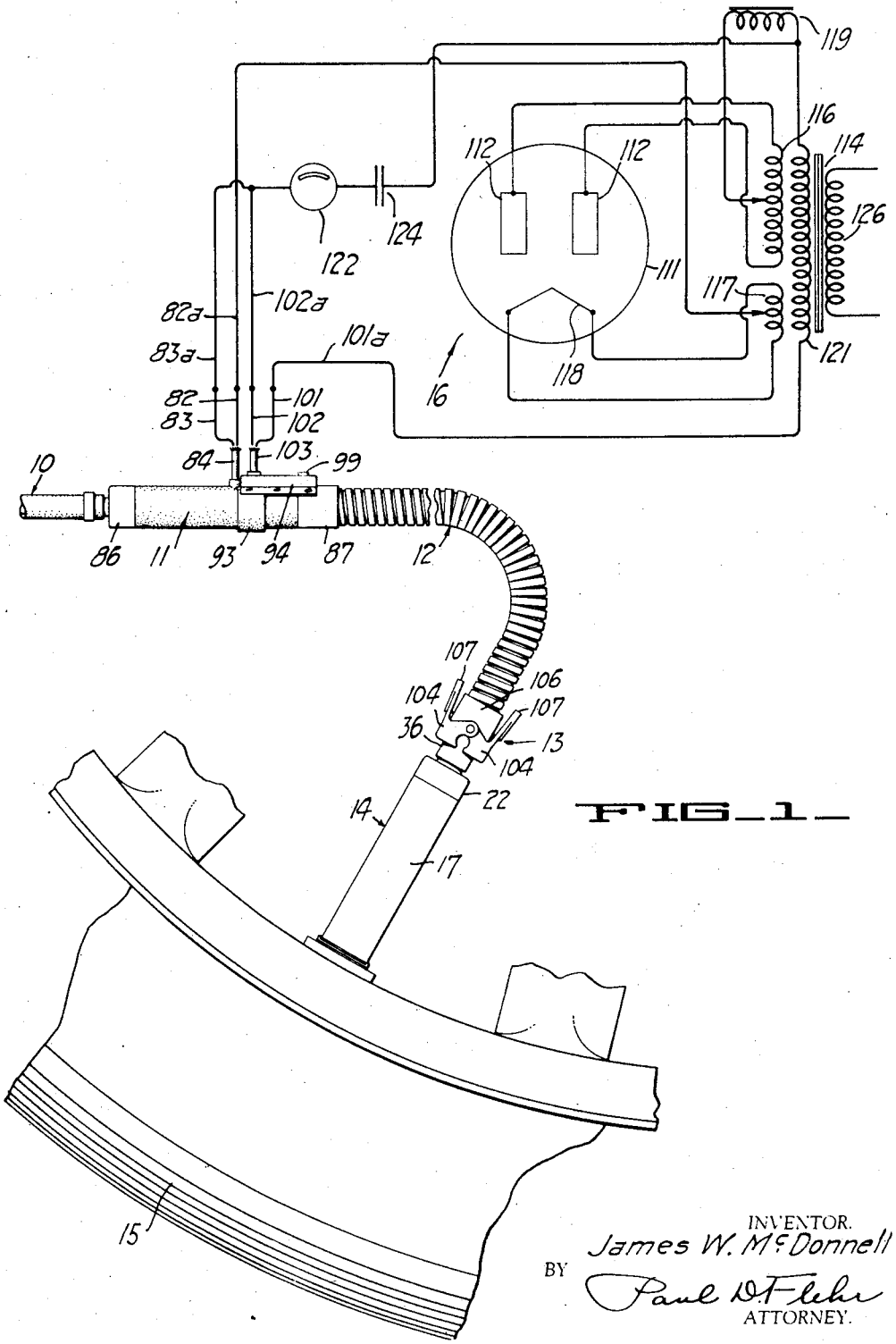
FIG_1
INVENTOR.
James W. McDonnell
BY Paul D. Flehr
ATTORNEY.

May 31, 1938.  J. W. McDONNELL  2,118,852
PRESSURE RESPONSIVE APPARATUS
Filed March 2, 1936  2 Sheets-Sheet 2
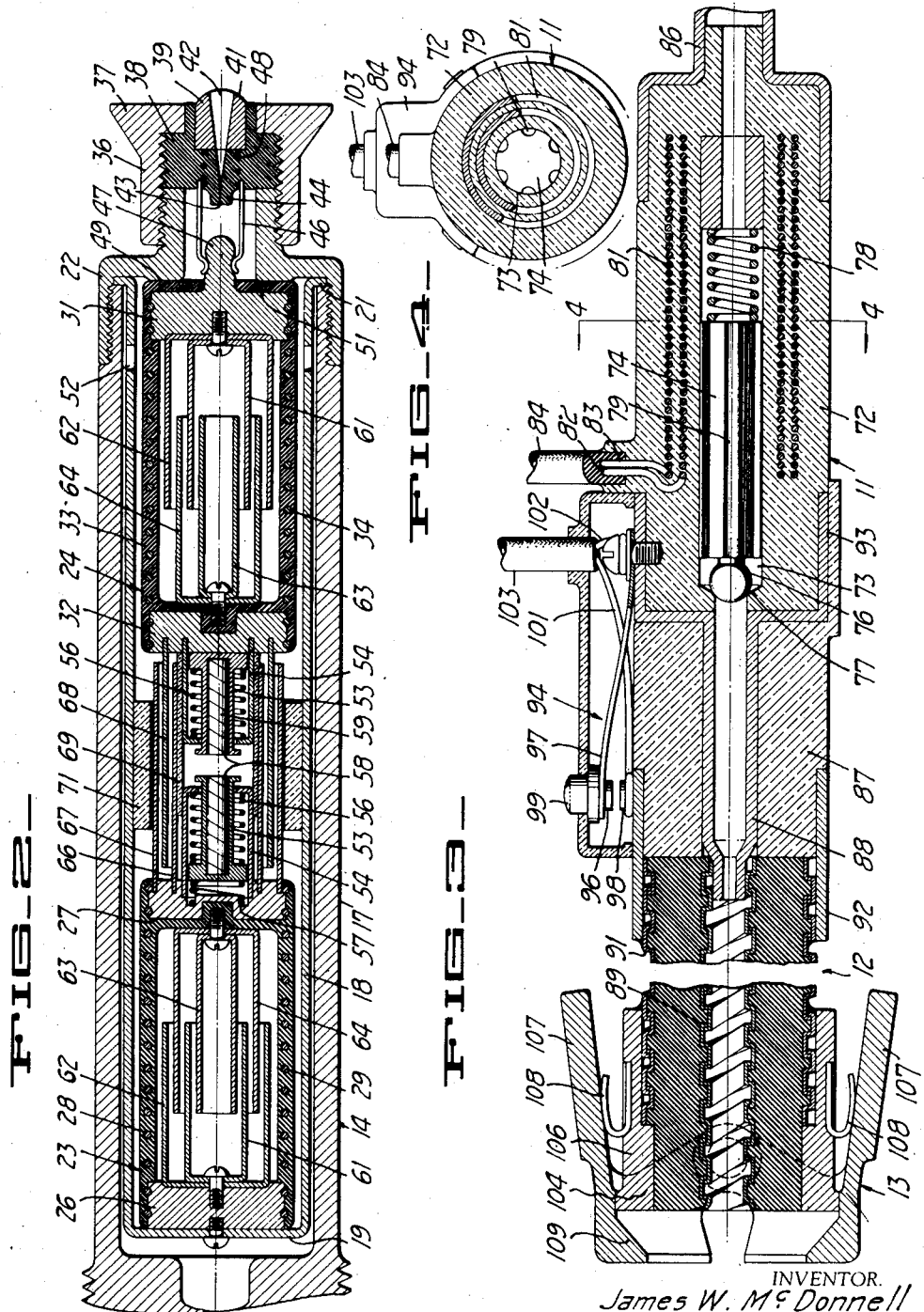
INVENTOR.
James W. McDonnell
BY Paul D. F. Flehr
ATTORNEY.

Patented May 31, 1938

2,118,852

UNITED STATES PATENT OFFICE 2,118,852

PRESSURE RESPONSIVE APPARATUS

James W. McDonnell, Palo Alto, Calif.

Application March 2, 1936, Serial No. 66,595

11 Claims. (Cl. 137—69.5)

This invention relates generally to apparatus used in conjunction with pneumatic pressure receivers. More specifically, it relates to apparatus for the inflation of the pneumatic tires of motor vehicles, and for indicating the amount of tire pressures.

It is an object of the invention to provide apparatus of the above character, whereby when an air hose is coupled to the tire of an automotive vehicle, air under pressure will be automatically supplied to the tire only if the tire pressure has dropped below a safe value.

It is another object of the invention to provide a novel type of an electrical apparatus for indicating tire pressure, which will function while the tire is being inflated.

Another object of the invention is to provide a novel form of electrical contacting means in conjunction with the stem or like part of a pneumatic tire, and which is opened and closed in accordance with variations in the tire pressure. In this connection the invention is characterized by the use of magnetic means in conjunction with the contacts, whereby when the contacts are closed, they are held together by a magnetic force which must be overcome before the contacts are again opened.

A further object of the invention is to provide a novel form of pressure sealing valve, which can be used in conjunction with the stem of a penumatic tire, and which can be opened without difficulty by applying air under pressure.

Additional objects of the invention will appear from the following description in which the preferred embodiment of the invention has been set forth in detail in conjunction with the accompanying drawings.

Referring to the drawings:

Fig. 1 is a schematic view, showing the manner in which my apparatus can be used to inflate a pneumatic tire.

Fig. 2 is a side elevational view, in cross-section, showing parts of my apparatus which can be assembled in conjunction with a tire stem or like part.

Fig. 3 is a side elevational view, in cross-section, showing parts of my apparatus for use in conjunction with an air hose leading to a source of gas under pressure.

Fig. 4 is a cross sectional detail taken along the line 4—4 of Fig. 3.

Referring first to Fig. 1, I have shown an air hose 10, leading from a source of air under pressure, and such as is used in filling stations for the inflation of automotive tires. In conjunction with the hose 10, there is a device 11, which includes a valve by means of which the flow of compressed air is controlled. A flexible hose or conduit section 12 leads from device 11, and by the use of coupling means 13, connection can be established to the valve stem 14 of a pneumatic tire 15. Certain electrical conductors are shown extending from the device 11, to the electrical net work 16.

The construction of the stem 14, and the parts carried within the same, can be explained by reference to Fig. 2. It consists of a tube 17, one end of which may connect directly to the inner tube of the tire, and thus take the place of a standard valve stem, or it may be coupled to a valve stem of standard construction, after the valve parts thereof have been removed. Disposed within the outer tube 17, there is a liner tube 18, the inner end 19 of which is closed. As representative of suitable means for retaining this liner tube in place, its forward end is shown provided with a flange 21, which is gripped between the adjacent end face of tube 17, and the threaded fitting 22. Disposed within the liner tube 18, are the pressure responsive cells 23 and 24.

Cell 23 consists of a pair of end members 26 and 27, made of suitable material such as metal, together with a tube 28 of resilient material, such as soft vulcanized rubber. Tube 28 has embedded in it the convolutions of a helicoidally wound wire 29, whereby the tube has sufficient strength to resist lateral crushing, but can be compressed in the direction of its length, in response to externally applied pneumatic pressure. The ends of wire 29 are shown having electrical connection with the metal end members 26 and 27, while the end portions of the rubber tube are suitably sealed with respect to the end members 26 and 27, as by means of a vulcanized bond. Pressure cell 24 is of similar construction, in that it incorporates end members 31 and 32 corresponding to the end members 26 and 27, a resilient rubber tube 33, and a helicoidal re-enforcing wire 34.

Threaded upon the fitting 22, there is a coupling member 36, which is formed to facilitate quick attachment to an air hose, as for example by providing it with an annular bevelled portion 37. Connection between coupling member 36 and threading 22 is sealed by means of a resilient rubber insert 38. To provide for inflow of air during an inflating operation and an automatic check against escape of air, insert 38 is formed to provide a check valve. Thus a metal terminal 39 is bonded to the insert 38, and is provided with a spherically formed outer surface 41 to which connection can be readily made. Extending through member 39, and also through the insert 38, there is a passage 42, which is progressively flattened toward a slit 43 between the resilient rubber lips 44. Slit 43 is normally closed to effect a seal to withhold pressure within the tube 17, but when a greater pneumatic pressure is applied to passage 42, the slit is automatically opened. Mounted upon the insert 38 are the spring metal fingers 46, the inner ends of which are adapted to clip into engagement with a stud 47, which projects from the end member 31. For a purpose to be presently explained, a wire 48 is also embedded in the insert 38, and has its one end connected to terminal member 39, and its other end connected to the metal fingers 46.

An added seal against escape of pneumatic pressure from the interior of tube 17, can be provided as follows:—Fitting 22 is provided with an inner annular valve seat 49. This seat is normally engaged by a resilient rubber facing 51, provided upon the adjacent surface of member 31. Normally facing 51 engages seat 49, to provide an added seal, in addition to the sealing of slit 43. However, when sufficient pneumatic pressure is applied to passage 42 to open slit 43, facing 51 is forced away a slight amount from seat 49, and such movement is accommodated by the resilient fingers 46.

Insofar as the structure of Fig. 2 has been described, it will be evident that pressure of a tire or receiver to which the tube 17 is connected, is distributed about the pressure responsive cells 23 and 24. In this connection note that free communication is permitted between the space surrounding the liner tube 18, and the interior of this tube, as by means of ports 52. An increase in pneumatic pressure causes both the pressure responsive cells to decrease in length, while a decrease in pneumatic pressure causes these cells to elongate.

Electrical contact means is operated by expansion and contraction of the pressure responsive cells, and can be constructed as follows:— A pair of plungers 53 are provided, which are slidably disposed within the guide tubes 54. These tubes are in turn mounted upon the end members 27 and 32, of the pressure responsive cells 23 and 24. Compression springs 56 normally urge the plungers towards retracted position with respect to the tubes 54. Compression spring 57 however opposes complete retraction of one of the plungers 53. The opposed end faces 58 of the plungers 53, form electrical contactor surfaces. Fixed within the plungers 53 are the permanent electromagnets 59, which are disposed in such manner as to have unlike poles terminating at the surfaces 58. Thus assuming that the pressure responsive cells 23 and 24 elongate a sufficient amount, due to a drop in pressure, to bring the contacting surfaces 58 into engagement, the surfaces will be retained together by a definite amount of magnetic attraction. This attraction serves to retain contacting surfaces 58 together, until overcome by pull exerted by pressure responsive cells 23 and 24, after pressure in tube 17 has been increased to a predetermined value. It may be pointed out at this time that the relationship between the parts is such that contacting surfaces 58 do not come into engagement until the tire pressure, and the pressure within tube 17, falls below a safe operating value. Upon increasing the pressure by inflating the tire, it is evident from the above that the pressure must be increased a considerable degree, to cause the contacts 58 to break, which pressure may correspond generally to a proper operating pressure, or a pressure to which it is desirable to inflate the tire.

With respect to the electrical connections made to the contactor surfaces 58, it should be noted that these surfaces are in electrical contact with the guide tubes 54, which in turn connect to the embedded wires 29 and 34, of the pressure responsive cells. The other end of wire 29 connects through end member 26 to the tube 18, which in turn is grounded to the external casing or tube 17. Wire 34 connects through member 31, to the spring fingers 46, and from thence through wire 48 to the connector member 39. Thus electrical connection to the contactor surfaces 58, can be established by making electrical connection with the metal coupler part 36, and to the terminal member 39.

In addition to the electrical contacts or contactor surfaces 58, it is desirable to provide electrical means making it possible to measure or secure an index of the pneumatic pressure within the tire. For this purpose tubular magnetic cores 61 and 62, are shown mounted upon the end member 31, and similar cores are mounted upon the end member 26 for the pressure cell 23. These tubular cores are adapted to interleave with similarly formed plates 63 and 64, carried by the end members 27 and 32. The magnetic cores associated with each of the pressure responsive cells form variable magnetic flux paths, which assist in varying the inductive reactance of the helicoidally wound wires 29 and 34 as the cells expand or contract.

In addition to the variable magnetic means formed as described above, a variable condenser is arranged between the pressure responsive cells, and is electrically connected in shunt with the contactor surfaces 58. Thus tubular condenser plates 66 and 67 are carried by the end member 27 of cell 23, and are arranged to interleave with tubular condenser plate 68, carried by the end member 32. A sleeve 69 of insulating material can be interposed between the tubular plate 66 and the guide tubes 54, in order to avoid short-circuiting. Likewise a guide sleeve 71 of insulating material, can be interposed between the outer tubular condenser plate 67, and the adjacent inner surface of the liner tube 18. With such an arrangement it is evident that when the contactor surfaces 58 are moved apart, the variable electrical condenser formed by the tubular plates 66 and 67, in conjunction with tubular plate 68, is decreased in value.

The device 11, previously referred to in connection with Fig. 1, is illustrated in detail in Figs. 3 and 4. According to the details illustrated it consists of a relatively rigid section 72, formed of suitable material such as a molded condensate product, which has a passage 73 extending through the same. In order to form an electrically operated valve, a plunger 74 of magnetic material is slidably mounted in the passage 73. One end of this plunger carries a ball 76, adapted to seal upon a valve seat 77. A compression spring 78 serves to urge the plunger 74 in a direction to close ball 76 upon the seat 77. The plunger can be provided with longitudinal grooves 79, to permit flow of air past the same. Surrounding the passage 73 there is a magnetic winding 81, which is connected to the two conductors 82 and 83 of an electric cord 84. One end of section 72 is provided with a suitable fitting 86, for coupling the same to the air hose 10. Section 72 carries an extension 87, which contains a central metal tube 88, the passage through this tube being in communication with the passage 73 through valve seat 77. Extension 87 is coupled to the flexible conduit 12, which is shown provided with both inner and outer flexible metal sheaths 89 and 91. As illustrated, the inner flexible sheath 89 is electrically connected with one end of the metal tube 88, while the outer metal sheath 91 is electrically connected to a metal sleeve 92, surrounding extension 87. Tube 88 is also electrically connected with a metal sleeve 93, which surrounds the main body of section 72.

A simple form of switch 94 is shown mounted in a position convenient to be manipulated by the hand of an operator. This switch is shown consisting of a movable contact 96, carried by the spring strip 97, and cooperating with a stationary contact 98. Contact 96 connects with sleeve 93, and thence, through tube 88, to the inner flexible sheath 89. Stationary contact 98 is electrically connected to sleeve 92, and to the outer flexible metal sheath 91. By manually depressing the push-button 99, the contacts 96 and 98, are closed. The contacts of this switch also connect with conductors 101 and 102, of a flexible electrical cord 103.

A part of suitable coupling means, for making quick coupling engagement with the device 14, is also illustrated in Fig. 3. It consists of a pair of levers 104, pivotally carried by a sleeve 106 which is secured to the end of the flexible conduits 12. These levers carry finger engaging arms 107, and can be pressed inwardly by the operator against the springs 108. Levers 104 also carry arcuate bevelled portions 109, which are adapted to engage over the annular bevelled portion 37 of the coupling part 36 (Fig. 2). In establishing such connection it is evident that the outer flexible metal sheath 91 of the conduit 12 is electrically connected, through levers 104 and arcuate portions 109, with the coupling part 36 and the tube 17. Likewise the terminal member 39 of the device shown in Fig. 2, is pressed into electrical engagement with the exposed end of the inner metal sheath 89. Thus electrical connections are automatically established between the device of Fig. 2, and the electrical contacts 96 and 98.

The electrical network 16, illustrated in Fig. 1, can be formed as follows:—An electron type of rectifier tube 111 is provided, which is provided with the anodes or plates 112. A power supply transformer 114 has one secondary winding 116, with its terminals connected to the plates 112. Another secondary winding 117 can be provided for heating the cathode 118. Conductor 82a which is connected to conductor 82 of cord 84, leads to center tap on the secondary winding 117. Conductor 83a, which is connected to conductor 83 of cord 84, leads to one side of a choke inductance 119, the other side of which connects with a third secondary transformer winding 121. The other terminal of winding 121 is connected by lead 101a, to the conductor 101 of cord 103. Leads 83a and 102a, which connect to the conductors 83 and 102 of the cords, are connected together and to one side of an alternating current meter 122. The other side of the meter is connected through condenser 124 to a point between choke 119 and winding 121.

Operation of my complete apparatus can now be outlined as follows:—Assuming that the inflation stem of a pneumatic tire is equipped as described with respect to Fig. 2, when the pressure of the tire falls below a safe value, elongation of the pressure responsive cells 23 and 24, brings the contactor surfaces 58 into engagement. If now engagement is made with respect to the coupling means 13, a circuit is established with respect to conductors 101a and 102a, by means of which these conductors are shunted by the closed contactors 53. Thus direct current from the rectifier is caused to flow through the winding 81, because leads 82a and 83a are now connected across the center taps on windings 116 and 117, in series with choke 119 and winding 121. Rectified current flow in winding 81, retracts the magnetic plunger 74, and opens the ball 76 with respect to valve seat 77. Compressed air immediately flows from hose 10, through the valve seat 77 and the flexible conduit 12, and into the valve stem past the normally closed slit 43 and the secondary valve seat 49. After the tire has been inflated to a value approximating that desired, pressure responsive cells 23 and 24 exert sufficient force to overcome the magnetic attraction between the permanent electro-magnets 59, and therefore the contactor surfaces 58 are pulled apart. This immediately opens the rectifier circuit, with the result that rectified current ceases to flow through the winding 81, and ball 76 closes upon its seat.

Assuming that the alternating current supply connected to the transformer 114 is of suitable frequency, some alternating current continues to flow from the secondary winding 121, through the circuit established by condenser 124, meter 122, the inductively windings 29 and 24, and variable condenser plates 66, 67 and 68. Since the reactance values of the inductive pressure cell windings vary with changes in pressure, and since pressure variations likewise vary the capacitance formed by plates 66, 67 and 68, the alternating current flow will vary in accordance with the tire pressure and the meter 122 can be calibrated to read in terms of pressure per square inch.

If after the tire has been inflated to a pressure sufficient to cause the contactor surfaces 58 to open, it is desired to further increase the tire pressure, switch button 99 is depressed, to place a temporary short circuit across the conductors 101a and 102a, and thus cause rectified current to flow in winding 81 to open the ball 76.

In the event it is not desired to employ an electric meter in the manner described, for the purpose of indicating the pressure of a tire, it is evident that this meter can be omitted. Likewise in such event the variable reactance elements incorporated in the tire stem, can be omitted.

It is evident that my apparatus can be used to advantage by gasoline filling stations, where considerable time is now wasted in alternately inflating and taking pressure readings of tires. With my apparatus it is only necessary for the operator to establish coupling with the tire stem, to automatically inflate the tire to a predetermined degree, after which there is an automatic pressure reading. If the pressure of the tire is not below a safe value, then no air will be introduced if the operator attempts an inflating operation. If however, the operator desires to introduce additional air, this can be accomplished by depressing the button 99.

I claim:

1. In apparatus of the character described for use with pressure receivers, a tube having one end of the same communicating with a pressure receiver, a pair of electrical contacts carried within said tube, pressure responsive means likewise carried within said tube and serving to effect opening and closing of said contacts in accordance with pressure of gas within the receiver, a hose adapted to be connected to a source of gas under pressure, coupling means for making quick detachable connection between one end of said hose and the other end of said tube, said last means including metal parts forming two electrical conductors insulated with respect to each other, and electrically connected to said electrical contacts.

2. In apparatus of the character described for use with pressure receivers, a tube having one end of the same communicating with a pressure receiver, a pressure responsive cell disposed within said tube, an electrical contact carried by one end of said cell, another electrical contact associated with said first named contact, magnetic elements associated with both said contacts and serving to exert a force tending to retain said contacts closed until said contacts are pulled apart with sufficient force to overcome said magnetic attraction.

3. In apparatus of the character described for use with pressure receivers, a tube having one end of the same communicating with a pressure receiver, a pressure responsive cell disposed within said tube, said cell including end walls connected by resilient side walls, whereby when external pressure upon the same is increased, said end walls are forced towards each other, mounting means for said cell serving to fix one end wall of the same with respect to the tube, an electrical contact carried by the other end wall of said cell, a second electrical contact carried within said tube and cooperating with said first named contact, and magnetic means associated with both said contacts, and providing a predetermined magnetic force tending to retain the same in closed condition.

4. In apparatus of the character described, a tube having one end of the same adapted to communicate with a pressure receiver, a pressure responsive cell disposed within said tube, said cell being formed of end walls and tubular side walls of resilient material connecting the end walls, said side walls having a helicoidally formed wire embedded therein, and interleaved plates of an electrical condenser carried by said end walls and electrically connected to the terminals of said wire.

5. In apparatus of the character described, a tube having one end of the same adapted to communicate with a pressure receiver, a pair of pressure responsive cells disposed within said tube, each of said cells being adapted to contract in the direction of the axis of the tube when the pressure within the receiver increases, interleaved plates of a variable electrical condenser associated with each of said cells, and interleaved plates of a variable condenser interposed between said cells.

6. In apparatus of the character described, a tube having one end of the same adapted to communicate with a pneumatic pressure receiver, a pair of pressure responsive cells disposed within said tube, each of said cells including a pair of end members connected by tubular side walls of resilient material, said side walls being reinforced by a helicoidally wound wire embedded in the same, whereby each cell is adapted to expand and contract responsive to varying pressures within said receiver, in a direction longitudinally of the axis of the tube, interleaved plates of a variable electrical condenser disposed within each of said pressure responsive cells, each of said condensers being electrically connected to the terminals of the helicoidally wound wire for the associated cells, means serving to retain said cells in substantial alignment, with their respective remote end members substantially fixed with respect to the tube, and interleaved plates of a variable electrical condenser carried by the adjacent end members of said cells, whereby when said cells are caused to expand and contract responsive to varying pneumatic pressure within said receiver, the reactance values of all of said variable electrical condensers are varied.

7. In apparatus of the character described for use with pressure receivers, a tube having one end of the same communicating with a pressure receiver, a hose adapted to be connected to a source of gas under pressure, coupling means for detachably connecting one end of the hose to the other end of the tube, an electrically operated valve serving to control flow of gas through said hose, and means responsive to pressure within the receiver for effecting opening and closing of said valve, said last means including an electrical energizing circuit having at least one conductor of the same established through said coupling means, whereby said circuit is disrupted when said hose is disconnected with respect to said tube.

8. In apparatus of the character described for use with pressure receivers, a tube having one end of the same communicating with a pressure receiver, a hose adapted to be connected to a source of gas under pressure, coupling means for detachably connecting one end of the hose to said tube, a valve associated with the hose and serving to control flow of gas through the same, and means responsive to pressure within the receiver for effecting opening and closing of said valve, said last means including a pair of electrical contacts disposed within said tube, and means likewise disposed within said tube responsive to the pressure of gas within the receiver for effecting opening and closing movements of said electrical contacts.

9. In apparatus of the character described for use with pressure receivers, a tube having one end of the same communicating with the pressure receiver, a hose adapted to be connected to a source of gas under pressure, coupling means for detachably connecting one end of the hose to said tube, a pair of electrical contacts carried within said tube, means incorporated in said coupling means for making electrical connection with said contacts, means responsive to pressure within the receiver for effecting opening and closing of said contacts, valve means for controlling flow of gas through said hose, and means controlled by closing and opening of said contacts for controlling opening and closing of said valve.

10. In apparatus of the character described for use with pressure receivers, a tube having one end of the same communicating with the pressure receiver, a hose adapted to be connected to a source of gas under pressure, coupling means for detachably connecting one end of the hose to the other end of said tube, whereby said hose can be quickly attached or disconnected with respect to said tube, an electrically operated valve associated with said hose and serving to control flow of gas through the same, and means responsive to pressure within the receiver for effecting energization of said valve, said last means including a pair of electrical contacts carried within said tube, pressure responsive means likewise carried within said tube and adapted to move said contacts between open and closed positions, and current carrying conductors extending from said contacts and formed in part by said coupling means, whereby when said hose is detached with respect to said tube electrical connection with said contacts is disrupted.

11. In apparatus of the character described for use with pressure receivers, a tube having one end of the same communicating with a pressure receiver, a pair of electrical contacts carried within said tube, a pressure responsive cell disposed within said tube and connected to one of said contacts, whereby said contacts are permitted to close when the pressure within the receiver drops below a predetermined value, and magnetic means serving to retain said contacts closed until the pressure within the receiver exceeds a predetermined value.

JAMES W. McDONNELL.